United States Patent

Ranatza et al.

[11] 3,812,344
[45] May 21, 1974

[54] DERAILMENT ACTUATED AIR BRAKE CONTROL FOR TRAINS

[76] Inventors: Samuel Ranatza, 68 Hickory St., Harahan, La. 70123; John C. Linn, Rt. 4, Box 50, Summit, Miss. 39666

[22] Filed: Aug. 24, 1972

[21] Appl. No.: 283,285

[52] U.S. Cl................. 246/171, 74/100, 200/61.44
[51] Int. Cl. ............................................ B60T 7/12
[58] Field of Search ........... 240/170, 171, 200, 203; 74/100; 200/61.24, 61.41, 61.44, 61.08, 61.42

[56] References Cited
UNITED STATES PATENTS

| | | | |
|---|---|---|---|
| 838,442 | 12/1906 | Osoling | 246/200 A |
| 1,044,180 | 11/1912 | Howard | 246/171 |
| 3,535,511 | 10/1970 | Foster et al. | 246/170 |
| 1,065,659 | 6/1913 | Bohannon et al. | 246/172 |
| 1,540,247 | 6/1925 | Bowman | 74/100 |
| 57,404 | 8/1866 | Stiles | 246/171 |
| 3,418,462 | 12/1968 | Wilson et al. | 246/240 |

Primary Examiner—Robert G. Sheridan
Assistant Examiner—George H. Libman
Attorney, Agent, or Firm—Clarence A. O'Brien; Harvey B. Jacobson

[57] ABSTRACT

A railroad car truck is provided with an outwardly projecting support structure at one end from whose free end a depending lever arm is pivotally supported for oscillation about a horizontal transverse axis, the lever arm being swingable approximately 90° in either direction from a generally vertically disposed depending position. The lower end of the arm is provided with a crosshead for positioning a spaced distance above an associated rail when the wheels of the truck are on the rail and the crosshead is engageable with the rail when the wheels of the truck are derailed and drop downwardly alongside the rail. Contact of the crosshead with the rail causes the lever, which is maintained in a depending position by means of a shearpin, to swing rearwardly relative to the direction of travel of the truck and the lever is connected to a dump valve for the air brake system of the associated train car for opening the valve upon swinging of the lever passed a position angularly displaced 45° relative to the vertical position thereof. Spring means is connected between the support and the lever for yieldingly biasing the lever to a 90° rotated position in either direction once the lever is swung from its vertical position upon the shearing of the pin and the support includes a pair of electrical switches which are engageable by the lever upon swinging of the latter 90° in either direction from the vertical position of the lever. The switches may be connected in parallel within a signal circuit extending to the locomotive and having an electrically actuated signal device serially connected therein within the locomotive.

6 Claims, 5 Drawing Figures

"

DERAILMENT ACTUATED AIR BRAKE CONTROL FOR TRAINS

The main object of this invention is to provide an apparatus which will automatically apply the brakes of a train when any truck on the cars comprising the train becomes derailed.

Another object of this invention, in accordance with the immediately preceding object, is to provide an assembly which will be operative in accordance with the immediately preceding object independent of the direction of movement of the train.

Still another object of this invention is to provide an assembly in accordance with the preceding object including means by which an electrically actuatable signal within the locomotive of the train may be actuated upon the assembly being actuated to apply the brakes of the train.

Another important object of this invention is to provide an assembly which may be readily incorporated into the manufacture of new train car trucks and which also may be readily added to existing train car trucks.

A final object of this invention to be specifically enumerated herein is to provide a derailment actuated air brake control for trains which will conform to conventional forms of manufacture, be of simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
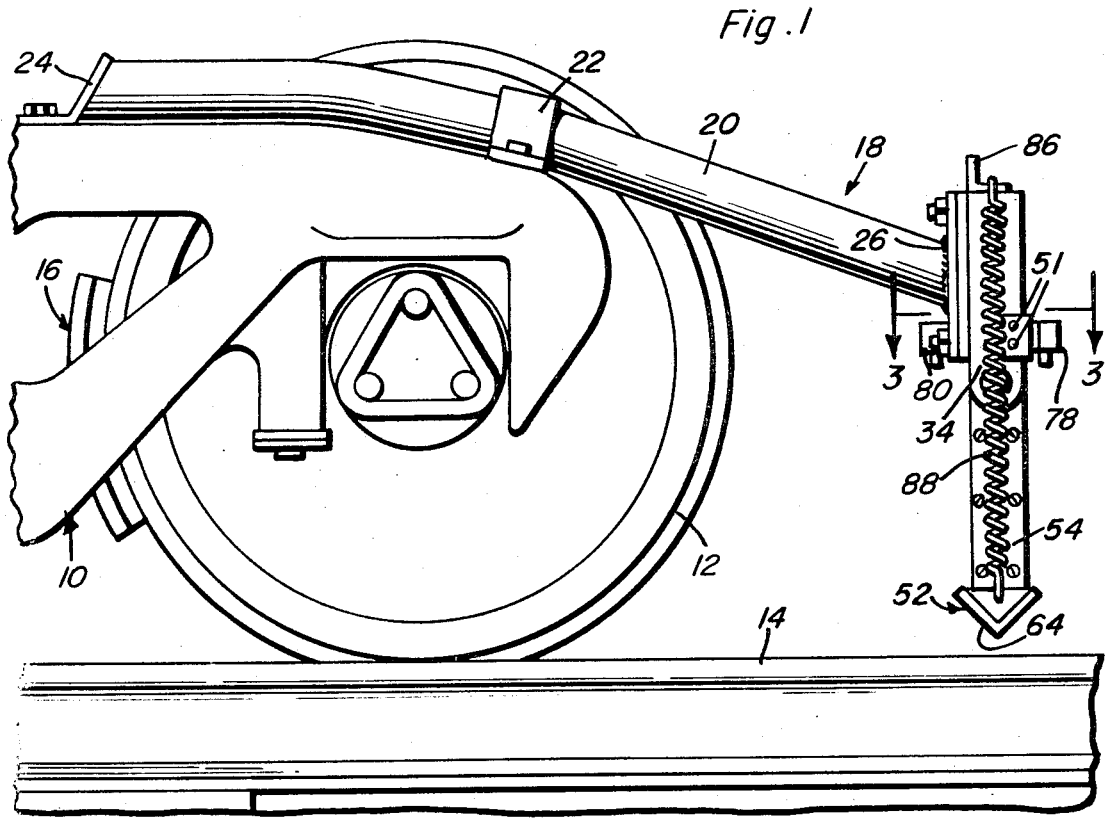
FIG. 1 is a fragmentary side elevational view of a train car truck with the brake control of the instant invention operatively associated therewith.

Referring now more specifically to the drawings, the numeral 10 generally designates a train car truck including flanged wheels 12 disposed on a railroad rail 14 for rolling of the wheels 12 along the rail 14. The truck 10 includes a conventional air brake actuated brake assembly referred to in general by the reference numeral 16 and the air brake control of the instant invention is referred to in general by the reference numeral 18.

Figure 2:
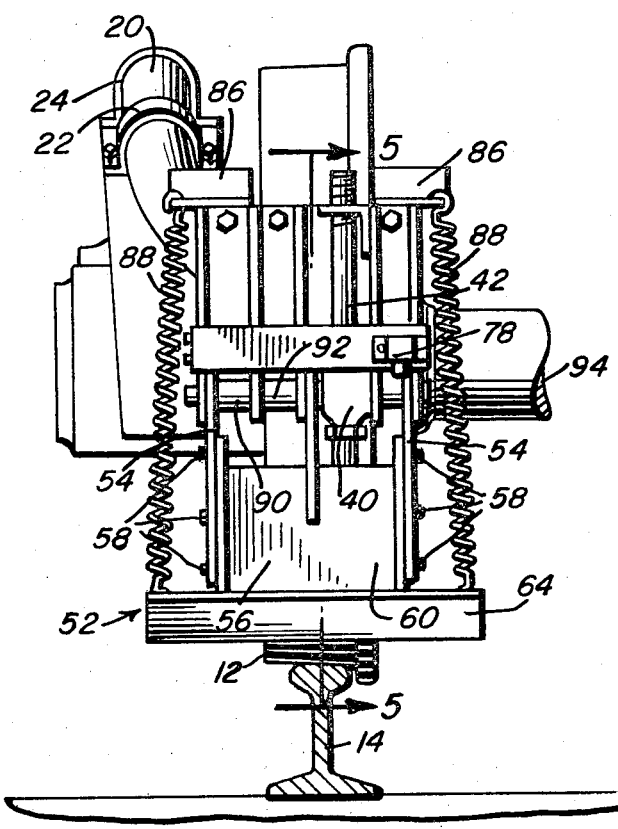
FIG. 2 is a fragmentary elevational view of the assembly illustrated in FIG. 1 as seen from the right side of FIG. 1.

With reference now more specifically to FIGS. 1 and 2 of the drawings, it may be seen that the control 18 includes an elongated support 20 having one end secured to the truck 10 as at 22 and 24. The other end of the support 20 has a mounting plate 26 secured thereto and it may be seen from FIGS. 3 through 5 of the drawings that the mounting plate 26 has a support plate 30 secured thereto by means of fasteners 32. The support plate 30 has five outstanding vertically disposed mounting flanges 34 secured thereto and which are disposed in upstanding relation and project forwardly of the front side of the support plate 30. The mounting flanges 34 have aligned bores 36 formed therethrough and the actuating shaft 38 of a valve assembly 40 is journaled through the bores 36, the valve assembly 40 including an inlet 42 and an outlet 44.

The forward upstanding edges of the mounting flanges 34 are interconnected by means of a bight portion 46 of a U-shaped strap 48 extending thereacross. The strap 48 includes similarly angulated opposite end parallel legs 50 which are secured to the opposite side mounting flanges 34 in any convenient manner such as by fasteners 51, see FIG. 1.

A lever referred to in general by the reference numeral 52 is provided and includes a pair of parallel lever arms 54 interconnected at their lower ends by means of a channel member 56 secured therebetween by means of fasteners 58. The channel member 56 includes a bight portion 60 which extends between the lever arms 54 and the lever 52 includes a third arm 61 which is secured to the central portion of the bight portion 60 as at 62, see FIG. 5.

The lever arms 54 and 61 are interconnected by means of a crosshead 64 in the form of an angle iron extending and secured between the lower ends of the arms 54 and 61. Also, the upper ends of the lever arms 54 and 61 include registered bores 66 and 68, respectively, registered with the bores 36 and through which the actuating or control shaft 38 extends. However, the third lever arm 61 is keyed to the shaft 38 as at 68. In addition, the upper end of the third arm 61 is provided with an aperture 70 which is registered with a similar aperture 72 formed in the center mounting flange 34. The apertures 70 and 72 receive a shearpin 74 therethrough in order to secure the lever 52 in the vertically disposed depending position illustrated in FIGS. 1 and 2 of the drawings and to releasably prevent swinging movement of the lever 52 to either of the phantom line positions thereof illustrated in FIG. 5.

One end portion of the bight portion 46 of the U-shaped strap 48 has a push button switch 78 supported therefrom and the opposite end or side portion of the mounting plate 36 has a similar push button switch 80 supported therefrom. The push button actuator 82 of the switch 78 is engageable by the right-hand lever arm 54 illustrated in FIG. 4 when the lever 52 is swung in a counterclockwise direction from the solid line position thereof illustrated in FIG. 5 to the phantom line position thereof illustrated in FIG. 5 and the actuator 84 of the switch 80 is engageable by the left-hand lever arm 54 illustrated in FIG. 4 when the lever arm 52 is swung from the solid line position thereof illustrated in FIG. 5 in a clockwise direction to the left-hand phantom line position of FIG. 5.

The upper ends of the opposite end pairs of mounting flanges 34 are interconnected by means of angle brackets 86 (see FIG. 2) secured thereto and a pair of expansion springs 88 extend from the angle brackets 86 to the opposite end portions of the crosshead 64. Accordingly, the springs 88 serve to yieldingly bias the lever 52 to either of the phantom line positions thereof illustrated in FIG. 5 once the lever 52 has been at least slightly angularly displaced from the solid line position thereof illustrated in FIG. 5.

It is to be noted that the inlet or inlet pipe 42 is to be communicated, by means of suitable piping or hoses, with the air brake system including the brake assembly 16. Thus, with the understanding that the valve assembly 40 is closed when the lever arm 52 is in the position thereof illustrated in solid lines in FIG. 5 of the drawings and that the valve assembly 40 is open when the lever 52 is disposed in either of the phantom line positions thereof illustrated in FIG. 5, should the truck 10 become derailed the wheels 12 will be lowered relative to the rail 14 thus causing the crosshead 64 to be moved downwardly into engagement with the rail 14. Of course, any movement of the truck 10 along the rail 14 will thereby cause the lower end of the lever 52 to swing from the solid line position of the lever illustrated in FIG. 5 in a rearward direction relative to the direction of movement of the truck 10 so as to angularly displace the lever 52 from the solid line position thereof illustrated in FIG. 5. After the lever 52 has been angularly displaced to any appreciable degree, the tension springs 88 function to rapidly swing the lever 52 to the corresponding phantom line position illustrated in FIG. 5 whereupon the valve assembly 40 will be opened. In addition, depending upon which direction the lever 52 is swung, one of the switches 78 and 80 will be actuated so that an electrically actuatable alarm disposed in the associated locomotive and serially connected in a circuit in which the switches 78 and 80 are connected in parallel may be actuated as soon as the lever 52 is swung to either of the phantom line positions thereof illustrated in FIG. 5. Thus, not only will the brake control of the instant invention cause the air brake lines to be vented so as to thus apply the brakes of the train in the event one of the trucks 10 becomes derailed, but the engineer in the locomotive is rendered a signal so that he may immediately back off on the throttle of the locomotive.

Figure 3:
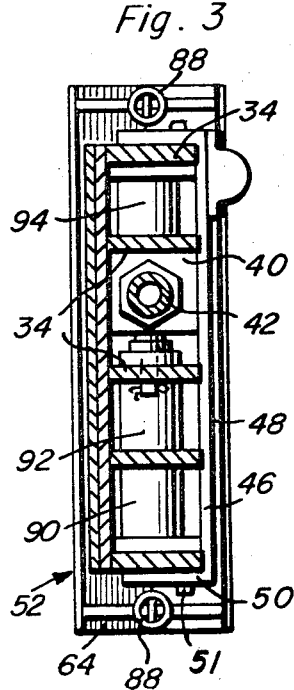
FIG. 3 is an enlarged horizontal sectional view taken substantially upon the plane indicated by the section line 3—3 of FIG. 1.
Figure 4:
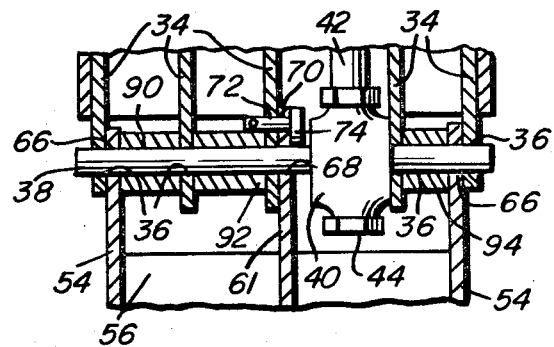
FIG. 4 is a fragmentary transverse vertical sectional view taken substantially upon the plane indicated by the section line 4—4 of FIG. 5.
Figure 5:
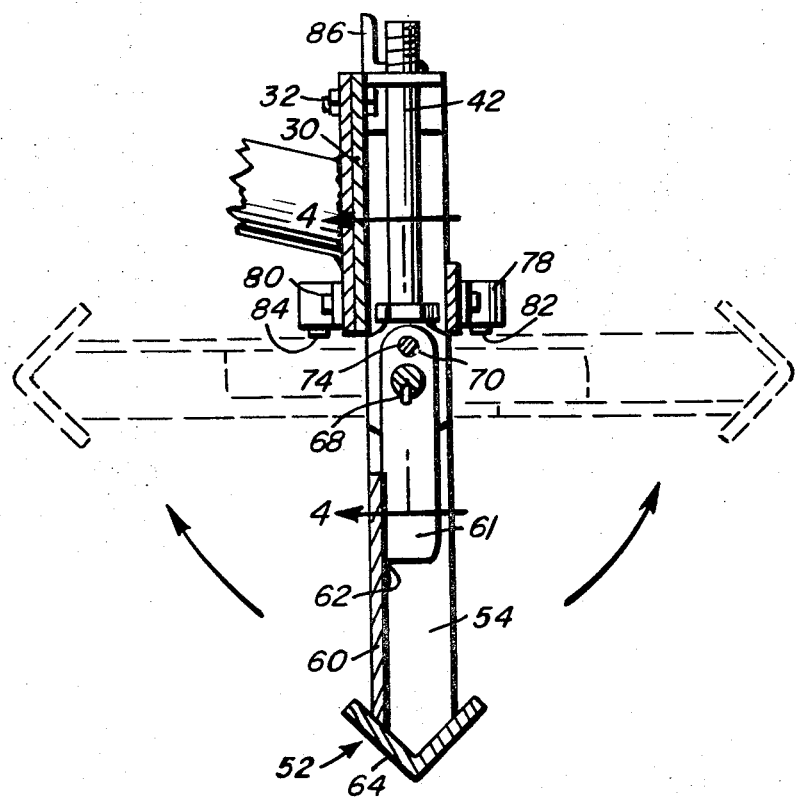
FIG. 5 is an enlarged longitudinal vertical sectional view taken substantially upon the plane indicated by the section line 5—5 of FIG. 2.

It will be noted from FIGS. 3 and 4 of the drawings that three sleeves 90, 92 and 94 are disposed on the shaft 38 between adjacent mounting flanges and lever arms 54 so as to maintain proper spacing between these components along the shaft 38. Also, the shearpin 70 may be constructed of a soft metal such as aluminum and it is to be noted that the support 20 may be formed as an integral portion of the frame of the truck as opposed to being constructed as a unit separate from the truck frame and secured to the latter by means of suitable fasteners.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a railroad car truck frame, an elongated upstanding lever, mounting means pivotally supporting the upper end portion of said lever from said frame for oscillation about a horizontal transverse axis, a valve assembly supported relative to said frame in a stationary manner and including an oscillatable actuator shiftable between a center closed position and oppositely displaced open positions, means connecting said lever to said actuator for displacement of the latter in said opposite directions from said center position in response to swinging of said lever in opposite directions from its upstanding center position, retaining means releasably retaining said lever in said upstanding position, said valve assembly including an inlet and an outlet, said inlet including means adapted for closed communication with the air pressure brake service line of an associated railway car, said mounting means including abutment means for limiting angular displacement of said lever in opposite directions from the centered upstanding position thereof, said abutment means including a pair of switch actuators for an associated pair of electrical switches, said actuators being engageable by said lever upon its swinging to the limit positions thereof from its upstanding center position for actuating said switches, elongated expansion spring means connected at one end to the lower end of said lever and at the other end to said mounting means at a point elevated above said axis, said expansion spring means, upon release of said retaining means and after said lever has been displaced slightly in either direction from said upstanding position thereof, being operable to swing said lever in the same direction to the corresponding limit position engaged with the corresponding switch actuator.

2. The combination of claim 1 wherein said actuator is rotatably supported from said valve assembly for oscillation about an axis aligned with the first-mentioned axis.

3. The combination of claim 1 wherein said lever and mounting means include side-by-side portions spaced radially of said axis through which a shearpin, comprising said retaining means, is secured.

4. The combination of claim 1 wherein said lever includes an elongated horizontally disposed crosshead on its lower end which generally parallels said axis.

5. The combination of claim 2 wherein said actuator passes through and is keyed to said lever for oscillation therewith.

6. In combination, a railroad car truck frame, an elongated upstanding lever, mounting means pivotally supporting the upper end portion of said lever from said frame for oscillation about a horizontal transverse axis, a valve assembly supported relative to said frame in a stationary manner and including an actuator shiftable between a center closed position and oppositely displaced open positions, means connecting said lever to said actuator for displacement of the latter in said opposite directions from said center position in response to swinging of said lever in opposite directions from its upstanding center position, retaining means releasably retaining said lever in said upstanding position, said valve assembly including an inlet and an outlet, said inlet including means adapted for closed communication with the air pressure brake service line of an associated railway car, elongated expansion spring means connected at one end to said lever below said axis and at the other end to said mounting means at a point elevated above said axis and substantially diametrically opposite the point on said lever to which said expansion spring is secured when said lever is in its upstanding center position, said mounting means including abutment means for limiting angular displacement of said lever in opposite directions from said centered upstanding position thereof, said abutment means including a pair of switch actuators for an associated pair of electrical switches, said actuators being engageable by said lever upon its swinging to the limit positions thereof from its upstanding position for actuating said switches, said expansion spring means, upon release of said retaining means and after said lever has been displaced slightly in either direction from said upstanding centered position thereof, being operable to swing said lever in the same direction to the corresponding limit position engaged with the corresponding switch actuator.

* * * * *